(12) United States Patent
Sumien et al.

(10) Patent No.: US 11,290,278 B2
(45) Date of Patent: Mar. 29, 2022

(54) INFLIGHT ENTERTAINMENT SYSTEM THAT SECURELY PAIRS AND COMMUNICATES WITH A USER DEVICE BASED ON MULTIPLE SECURITY CONTROLS

(71) Applicant: Thales Avionics, Inc., Irvine, CA (US)

(72) Inventors: Arnaud Sumien, Mission Viejo, CA (US); Olivier Quoit, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 339 days.

(21) Appl. No.: 16/248,389

(22) Filed: Jan. 15, 2019

(65) Prior Publication Data

US 2020/0228337 A1    Jul. 16, 2020

(51) Int. Cl.
*H04L 9/32* (2006.01)
*H04L 29/06* (2006.01)

(52) U.S. Cl.
CPC .......... *H04L 9/3228* (2013.01); *H04L 9/3247* (2013.01); *H04L 9/3268* (2013.01); *H04L 63/0823* (2013.01); *H04L 2463/082* (2013.01)

(58) Field of Classification Search
CPC . H04L 9/3228; H04L 9/3268; H04L 63/0823; H04L 9/3247; H04L 2463/082; H04L 9/088; H04L 2209/805; H04L 63/0846; H04L 9/3263; H04W 4/48; H04W 4/80; H04W 12/77; H04W 12/069; H04W 84/06

See application file for complete search history.

(56) References Cited

U.S. PATENT DOCUMENTS

| 2013/0097684 | A1 | 4/2013 | Kim | |
| 2013/0262857 | A1* | 10/2013 | Neuman | H04L 63/18 713/155 |
| 2016/0314462 | A1 | 10/2016 | Hong et al. | |
| 2017/0366360 | A9* | 12/2017 | Thompson | H04L 63/101 |

* cited by examiner

*Primary Examiner* — Jeffrey C Pwu
*Assistant Examiner* — Mayasa A. Shaawat
(74) *Attorney, Agent, or Firm* — Sage Patent Group

(57) ABSTRACT

An entertainment system to perform operations to securely pair and communicate with a user device based on multiple security controls. The operations include: Responsive to a request to pair the user device to a network interface, generating an encrypted code that includes network credentials for connecting to the network interface and a time-limited authentication credential that is unique to the user device. Responsive to a request to connect to a server of the entertainment system, generating a connection authorization decision for the user device based on two factor authentication validating (i) a second certificate of the user device, and (ii) the time-limited authentication credential that is unique to the user device. The entertainment system connects the user device to the server for secure communications when the connection authorization decision authorizes the connection based on successful two-factor authentication.

21 Claims, 9 Drawing Sheets

INFLIGHT ENTERTAINMENT SYSTEM THAT SECURELY PAIRS AND COMMUNICATES WITH A USER DEVICE BASED ON MULTIPLE SECURITY CONTROLS

FIELD OF THE INVENTION

The present disclosure relates to inflight entertainment systems for use in aircraft and, more particularly, to establishing secure pairing and communication connections between user devices and the inflight entertainment system based on multiple security controls.

BACKGROUND

In-flight entertainment and connectivity (IFE or entertainment) systems have been deployed onboard aircraft to provide entertainment, such as movies, television, audio entertainment programming, electronic games, and other electronic content to passengers or crew members. IFE systems without internet connectivity are increasingly using wireless access points or a wired network to provide the electronic content from a content server to passenger or crew member equipment that is carried on-board (e.g., cellular phones, tablet computers, laptop computers), seat video display units (SVDUs), and other communication terminals within the aircraft.

The proliferation of user devices pairing and communicating with an IFE system within an aircraft cabin can result in the display of unsecured credentials for connecting to and communicating with the IFE system. A crew member, for example, may operate a display on an aircraft to request to pair a user device with the aircraft's IFE system. In response to the request, network credentials for accessing the IFE system may be displayed in unsecured plain text on the display. A passenger onboard the aircraft may view the unsecured plain text and use the text to connect a user device to the aircraft's IFE system without authorization. Furthermore, once the user device connects to the aircraft network, operating the user device can result in difficulty when attempting to authenticate the user device to establish secure communications with a server on the aircraft. Although the user device may, for example, connect to the server by the crew member entering information on the user device, the entry of such information from the crew member does not seamlessly authenticate the user device to establish secure communications.

SUMMARY

Some embodiments of the present disclosure are directed to an inflight entertainment system for use in an aircraft that includes a memory connected to at least one processor that can establish secure pairing and communication with a user device based on multiple security controls. The inflight entertainment system includes a display device, a network interface, and a server having a first certificate that is digitally signed. The at least one processor is connected to the network interface, the display device, and the server. The memory connected to the at least one processor and stores program code that is executed by the at least one processor to perform operations that include: receiving a request to pair the user device to the network interface; responsive to the request to pair, generating an encrypted code. The encrypted code includes network credentials for connecting to the network interface and a time-limited authentication application for connecting to the server; communicating the encrypted code to the user device to decrypt; connecting to the user device through the network interface based on the at user device presenting the network credentials from the decrypted code; receiving a request to connect to the server from the user device having a second certificate that is digitally signed; responsive to the request to connect, generating a connection authentication decision for the user device based on two-factor authentication, wherein the two-factor authentication includes validating the second certificate and validating the time-limited authentication application; and connecting the user device to the server when the connection authorization decision authorizes the connection based on successful two-factor authentication.

Other embodiments of the present disclosure are directed to an entertainment system that includes a memory connected to at least one processor that can establish secure pairing and communication with a user device based on multiple security controls. The entertainment system includes a display device, a network interface, and a server having a first certificate that is digitally signed. The at least one processor is connected to the network interface, the display device, and the server. The memory connected to the at least one processor and stores program code that is executed by the at least one processor to perform operations that include: receiving a request to pair the user device to the network interface; responsive to the request to pair, generating an encrypted code. The encrypted code includes network credentials for connecting to the network interface and a time-limited authentication application for connecting to the server; communicating the encrypted code to the user device to decrypt; connecting to the user device through the network interface based on the user device presenting the network credentials from the decrypted code; receiving a request to connect to the server from the user device having a second certificate that is digitally signed; responsive to the request to connect, generating a connection authentication decision for the user device based on two-factor authentication, wherein the two-factor authentication comprises validating the second certificate and validating the time-limited authentication application; and connecting the user device to the server when the connection authorization decision authorizes the connection based on successful two-factor authentication.

Other embodiments of the present disclosure are directed to an electronic device that includes a memory connected to at least one processor that can establish secure pairing and communication with a user device based on multiple security controls. The electronic device includes a display device and a network interface. The at least one processor is connected to the network interface and the display device. The memory connected to the at least one processor stores program code that is executed by the at least one processor to perform operations that include: receiving a request to pair the user device to the network interface; responsive to the request to pair, generating an encrypted code. The encrypted code includes network credentials for connecting to the network interface and a time-limited authentication application for connecting to the at least one processor; communicating the encrypted code to the user device for the user device to decrypt; pairing the user device having a second certificate that is digitally signed to the network interface based on the user device presenting the network credentials from the decrypted code; responsive to the pairing, generating a connection authentication decision for secure communications for the user device based on two-factor authentication, wherein the two-factor authentication comprises validating the second certificate and validating the time-limited authentication application; and connecting the user device to the electronic device when the connection authorization decision authorizes the connection based on successful two-factor authentication.

Some embodiments of the present disclosure are directed to revoking the successful two-factor authentication of the user device by revoking at least one of: the validated second certificate and the validated time-limited authentication application.

Related vehicle entertainment systems for use in a vehicle, entertainment systems that may be used in non-vehicle applications, and electronic devices are disclosed. It is intended that all such vehicle entertainment systems, entertainment systems, and electronic devices within this description, be within the scope of the present inventive subject matter, and be protected by the accompanying claims. Moreover, it is intended that all embodiments disclosed herein can be implemented separately or combined in any way and/or combination

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
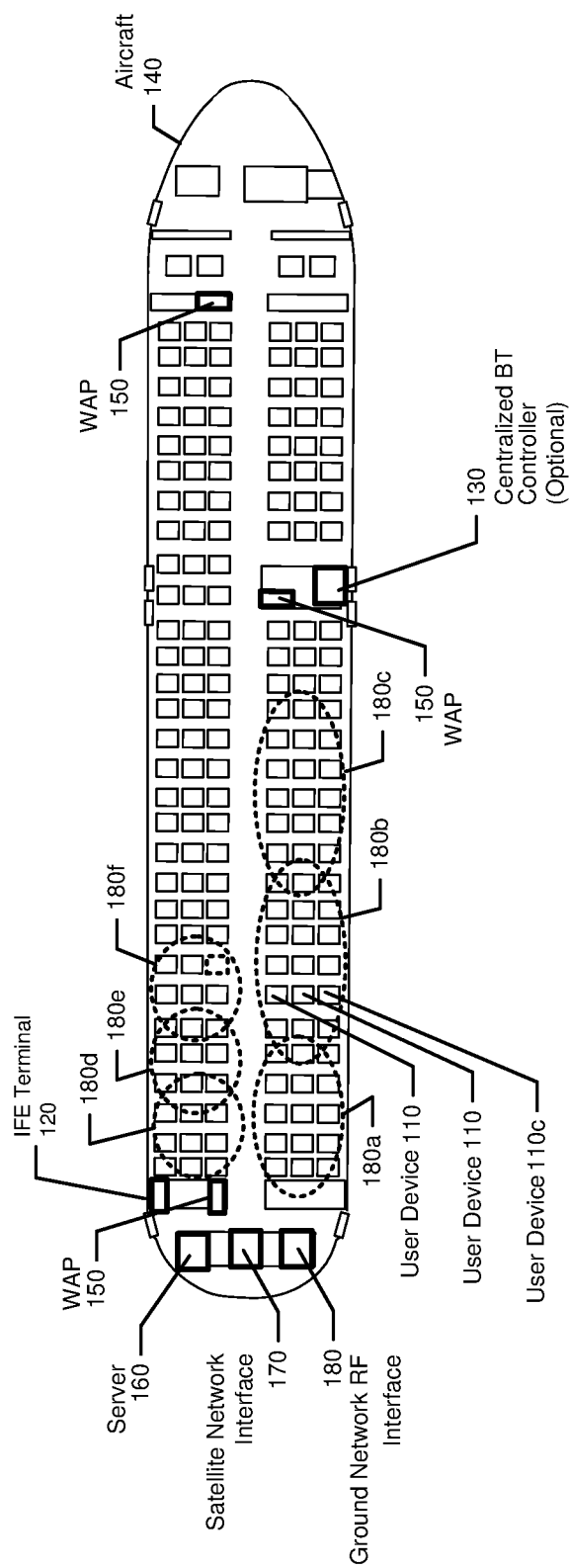
FIG. 1 illustrates an aircraft cabin containing an IFE system having a content server that streams electronic content through wireless access points (WAPs) to user equipment and/or through a wired network to seat video display units (SVDUs) that are controlled by wireless controllers, in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to operating a processor of an inflight entertainment system to more automatically and securely pair and communicate with a user device, and to do so without the user of a user device knowing or entering network credentials (e.g., SSID or Bluetooth ID to connect to the aircraft network) or credentials to authenticate the user device before connecting to a server of the inflight entertainment system.

For example, some embodiments are directed to a processor of an inflight entertainment system that executes program code to perform operations that securely pairs and establishes secure communications between a server of the inflight entertainment system and a user device using multiple security controls. Responsive to a request to pair the user device, the processor generates an encrypted code in which the network credentials and a unique time-limited authentication credential for the user device are encoded. The encrypted code is displayed on a communication terminal of the IFE system for the user device to scan with a camera and decrypt to connect to the aircraft network using the decrypted network credentials. Alternatively, the encrypted code is included in data communicated through a short range radio communications including, for example, via Bluetooth, RF signaling, or near filed field communication (NFC). The user device connects to the aircraft network using the decrypted network credentials, and initiates a request to connect to the server of the inflight entertainment system. The request to connect to the server includes a signed certificate of the user device and the decrypted time-limited authentication credential from the encrypted code. The processor performs two-factor authentication of the user device by validating that the signed certificate of the user device matches a signed certificate of the server, and that the user device connects to the server within a time period specified in the time-limited authentication credential. Various further embodiments of the present disclosure are directed to revoking either or both of the two-factors of authentication.

Various embodiments of the present disclosure thus are operable to securely pair and establish secure communications between the IFE system and a user device while the IFE is operating without internet connectivity and using multiple security controls. The multiple security controls include encrypted network credentials, secure connection to the server by validating the matching certificate signatures, and user device authentication by validating the time-limited authentication credential. The sharing of the network credentials, the validation of the certificates, and the validation of the time-limited authentication credential are each securely communicated without entry of information into the user device by a user to connect to the network and the IFE system.

Although various of the embodiments of the present disclosure are explained below in the non-limiting context of crew members using user devices to securely pair and communicate with an IFE system deployed on an aircraft, the invention is not so limited. Instead, these and other related embodiments may be used to securely pair and communicate with servers located in other types of vehicles, including without limitation, trains, automobiles, cruise ships, and buses; and with processors of electronic devices, including without limitation, medical devices and smart electronics, such as smart televisions.

These and other embodiments will be explained in further detail below in the non-limiting context of an IFE system that includes user devices. The user devices include passenger electronic devices (PEDs), crew member devices, and seat video display units (SVDUs) that may be mounted to structures within the aircraft, including to seatbacks, seat armrests/frames, bulkheads, overhead structures etc. and communicate through Bluetooth connections with user terminals, which are also referred to as passenger control units (PCUs) and passenger electronic devices (PEDs). The PEDs can be transported onto the aircraft by the passengers and crew members and include mobile phone units, tablet computers, laptop computers, wireless Bluetooth headphones, etc. The PCUs can be supplied as aircraft or vehicle equipment. The user terminals and SVDUs each include Bluetooth transceivers that are configured to transmit and receive radio frequency (RF) signals, such as in the ISM band. These devices are collectively referred to as user devices for convenience.

FIG. 1 illustrates an aircraft cabin 140 containing an IFE system that provides electronic content to passengers and crew members. The IFE system can include a content server 160 that streams and/or downloads electronic content through wired networks (e.g., Ethernet) and/or through wireless access points (WAPs) 150 to user devices 110, including PEDs and SVDUs 110 that may be mounted to structures within the aircraft, including to seatbacks, seat armrests/frames, bulkheads, overhead structures, etc. The content server 160 may additionally stream and/or download electronic content through WAPs 150 to user devices carried on-board by passengers and crew members, such as mobile phones, tablet computers, laptop computers, etc. The SVDUs 110 each contain a Bluetooth transceiver that wirelessly communicates through ISM band RF signaling with Bluetooth transceivers within various types of passenger and crew member controllers, which may be releasable docked to an armrest docket station and/or a docket station connected to or adjacent to some/all of the SVDUs 110. The SVDUs 110 may additionally communicate with various types devices that a passenger or crew member can bring on board the aircraft, such as wireless headphones and mobile computing devices, such as cellular phones, tablet computers, laptop computers, and other types of PEDs. The Bluetooth transceiver within a SVDU 110 is understood to be the communication circuitry (i.e., transceiver, signal processor, etc.) which can be incorporated within the same housing that at least partially encloses a display device, video display circuitry, network interface, and other circuitry providing functionality for the SVDU 110.

The SVDUs 110 can be connected to request and receive content from a central content server through a backbone network 208, such as 1000 base-T Ethernet. The PEDs can be operated by a passenger or crew member to wirelessly control the SVDU 110 through Bluetooth connections, such as to select content that is consumed from the content server (e.g., played through a display device), select among displayed menu items, and control other operations of the SVDU 110, and/or to receive content from the SVDU 110 such as audio streamed to wireless headphones.

Figure 2:
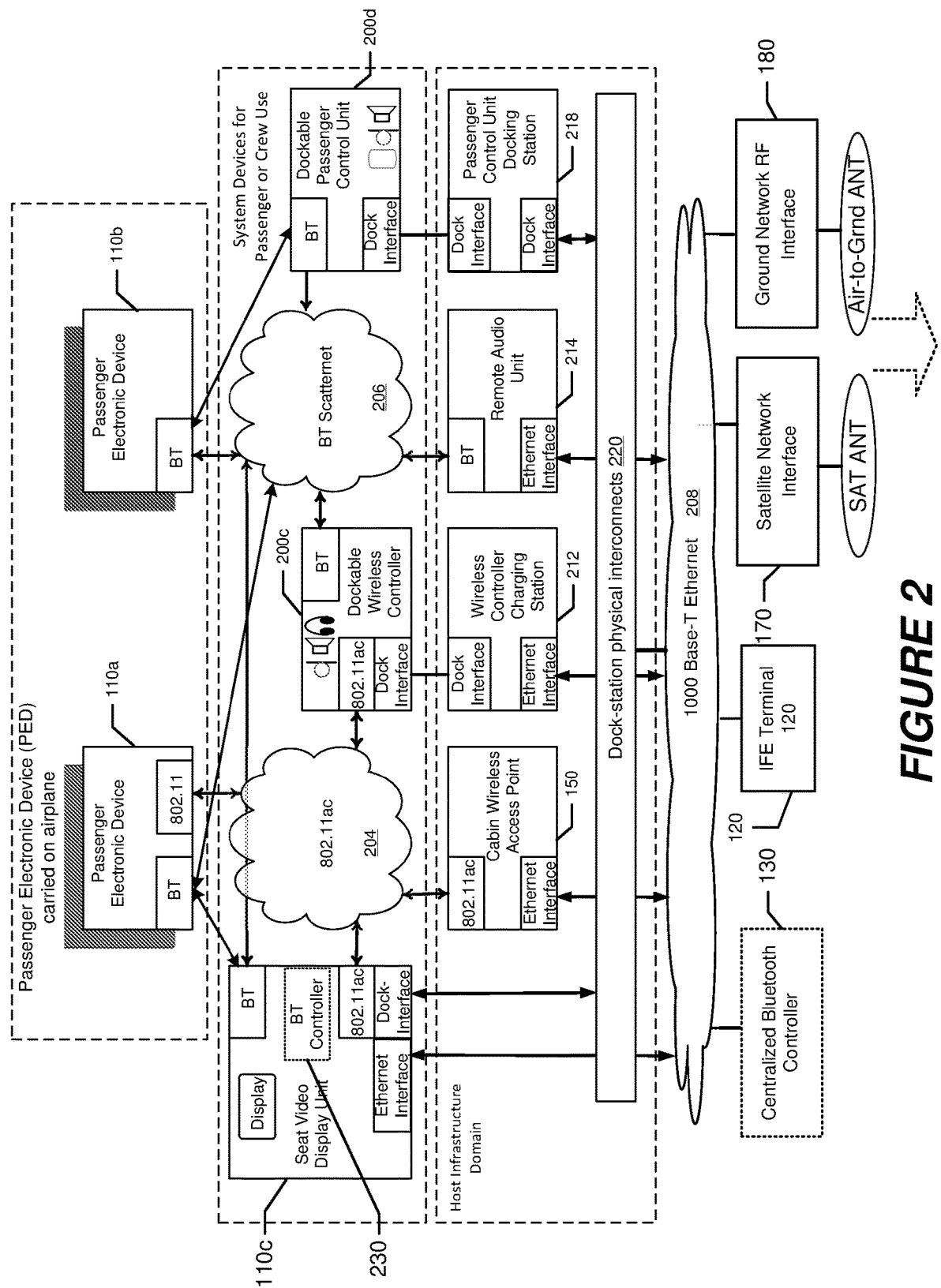
FIG. 2 is a block diagram illustrating the IFE system of FIG. 1 having elements that are configured to operate in accordance with some embodiments of the present disclosure.

FIG. 2 is a block diagram of the IFE system of FIG. 1 having elements that are configured to operate in accordance with some embodiments of the present disclosure. Referring to FIG. 2, the IFE system includes an IFE terminal 120 for crew member use, and which is configured to communicate with various types of user devices that can be carried on-board by crew members and/or provided by the airline. The IFE terminal 120 can communicate with server 160 and user devices using Bluetooth (BT) scatternet wireless network 206, may use an IEEE 802.11ac wireless network 204, and may use a backbone network 208, such as base-T Ethernet. The example user devices include PEDs 110*a* having a Bluetooth transceiver and/or a wireless network interface such as WiFi 802.11; and/or PEDs 110*b* having a BT transceiver.

Continuing with reference to FIG. 2, the IFE system includes system devices that can be located at each passenger seat location, and which is configured to communicate with various types of user devices that can be provided by the airline and/or carried on-board by passengers. The seat-located system devices can communicate using RF resources within the ISM band with the PCUs using a Bluetooth (BT) scatternet wireless network 206 and may use an IEEE 802.11ac wireless network 204. The example user devices include PEDs 110*a* having both a Bluetooth transceiver and a IEEE 802.11 (WiFi) transceiver and other user devices 110*b* having a Bluetooth transceiver.

The system devices can include a SVDU 110*c*, a dockable wireless controller 200*c*, and a dockable PCU 200*d*. The system may include only one or both of the dockable wireless controller 200*c* and the dockable passenger control unit 200*d*, which may be the same or similar type of device or may be different types of devices, and which can be collectively referred to as wireless controllers. The dockable wireless controller 200*c* and the dockable PCU 200*d* can be operated by a passenger to wirelessly control the SVDU 110*c*, such as to select content that is consumed (e.g., played through a display device), select among menu items, and control other operations of the SVDU 110*c*. Audio content may be streamed through the Bluetooth connection from the SVDU 110*c* to a user device, e.g., Bluetooth headphones. Pictures, video, textual information, and/or commands may be communicated from the SVDU 110*c* to a user device through the Bluetooth connection.

The example SVDU 110*c* includes a display device, video display circuitry, a general-purpose processor, a Bluetooth transceiver, and an Ethernet interface or other wired network interface. The dockable wireless controller 200*c* includes a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The dockable PCU 200*d* can similarly include a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The wireless controller 200*c*, the passenger control unit 200*d* and dockable passenger control unit 200*d*, collectively referred to as wireless controller 200, may be configured as handheld devices for operation by passengers and can be stored in docking stations, which may be configured to recharge batteries within the handheld devices. A wireless controller 200 may be a handheld device that is owned by the aircraft operator and provided for temporary use by a passenger during a flight, or may be a PED carried on-board by passengers, such as mobile phones, tablet computers, laptop computers, wireless headphones, etc.

The seat-located system devices are connected to host infrastructure that can include the cabin WAPs 150 spaced apart within the aircraft cabin and mounted to cabin ceiling structures, storage bin structures, bulkheads, etc. An Ethernet backbone network 208, e.g., 1000 Base-T Ethernet, extends throughout the aircraft cabin to communicatively interconnect the seat-located system devices to the server 160 and the WAPs 150. The WAPs 150 can each include an 802.11ac or other WiFi transceiver and an Ethernet interface that connects to the Ethernet backbone network 208.

The host infrastructure can include a PCU docking station 218, a wireless controller charging station 212 (although its functionality may be incorporated into the docking station 218), and a remote audio unit 214. The wireless controller charging station 212 may be located at each seat and have a dock interface that releasably stores the dockable wireless controller 200*c* and charges a battery therein, and has an Ethernet interface that connects to the Ethernet backbone network 208. The PCU docking station 218 may also be located at each seat and have a dock interface that releasably stores the dockable PCU 200*d* and charges a battery therein, and has an Ethernet interface that connects to the Ethernet backbone network 208.

The SVDU 110*c* facing a seat includes a processor that is connected to communicate through a Bluetooth transceiver and through the wired interface of the docking station 218. A wireless controller (PCU) 200 includes a processor connected to communicate through a wired interface and a Bluetooth transceiver. The wireless controller 200 is configured to be releasably docked in the docking station 218 to communicatively connect the wired interfaces of the wireless controller 200 and the docking station 218. While docked in the docking station 218 the processor of the wireless controller 218 and the processor of the display unit 110*c* may be configured to communicate through the wired interfaces of the wireless controller 200 and the docking station 218, via a dock-station physical interconnects (e.g., wired connections) 220, to establish a Bluetooth connection between the Bluetooth transceivers of the wireless controller 200 and the display unit 110*c*. The processor of the wireless controller 200 may be configured to not operate to establish the Bluetooth connection using communications through the Bluetooth transceiver of the wireless controller 200. Accordingly, a Bluetooth connection between a pair of Bluetooth transceivers in a wireless controller 200 and a SVDU 110*c* is establish through wired communications and subsequent communications while the Bluetooth connection is maintained are then performed through the Bluetooth transceivers.

The system further includes the central Bluetooth controller 220 that is communicatively connected to the SVDUs 110*c* through the Ethernet backbone network 208 and/or through the WiFi 802.11 network 204.

The remote audio unit 214 may be located at each seat or adjacent to a group of seats, and can contain a wired headphone jack, a Bluetooth transceiver, and an Ethernet interface that connects to the Ethernet backbone network 208, to receive and play audio through a loudspeaker and/or through the Bluetooth transceiver and/or the wired headphone jack to a headset worn by one or more passengers.

To pair and establish communications between user devices and some computer systems located in vehicles operating without internet connectivity, unsecured network credentials are displayed. More particularly, when a user operates a display located in the vehicle to request to pair with such computer systems, the display of the vehicle displays Wi-Fi or Bluetooth network credentials for the vehicle in unsecured plain text. Any person in the vicinity of the display, or eavesdropping on the display of the vehicle, can connect devices and communicate with the computer system of the vehicle without authorization. Additionally, in such systems, the vehicle computer system does not authenticate the user device before granting access to the vehicle computer system. For these and other reasons, various embodiments disclosed herein are directed to securely pairing and establishing secured communicates between user devices and vehicle computer systems using multiple security controls to secure the network credentials of the vehicle, establish a secure connection with a server of the vehicle, and to uniquely authenticate each user device via a unique time-limited authentication credential provided by each user device.

Figure 3:
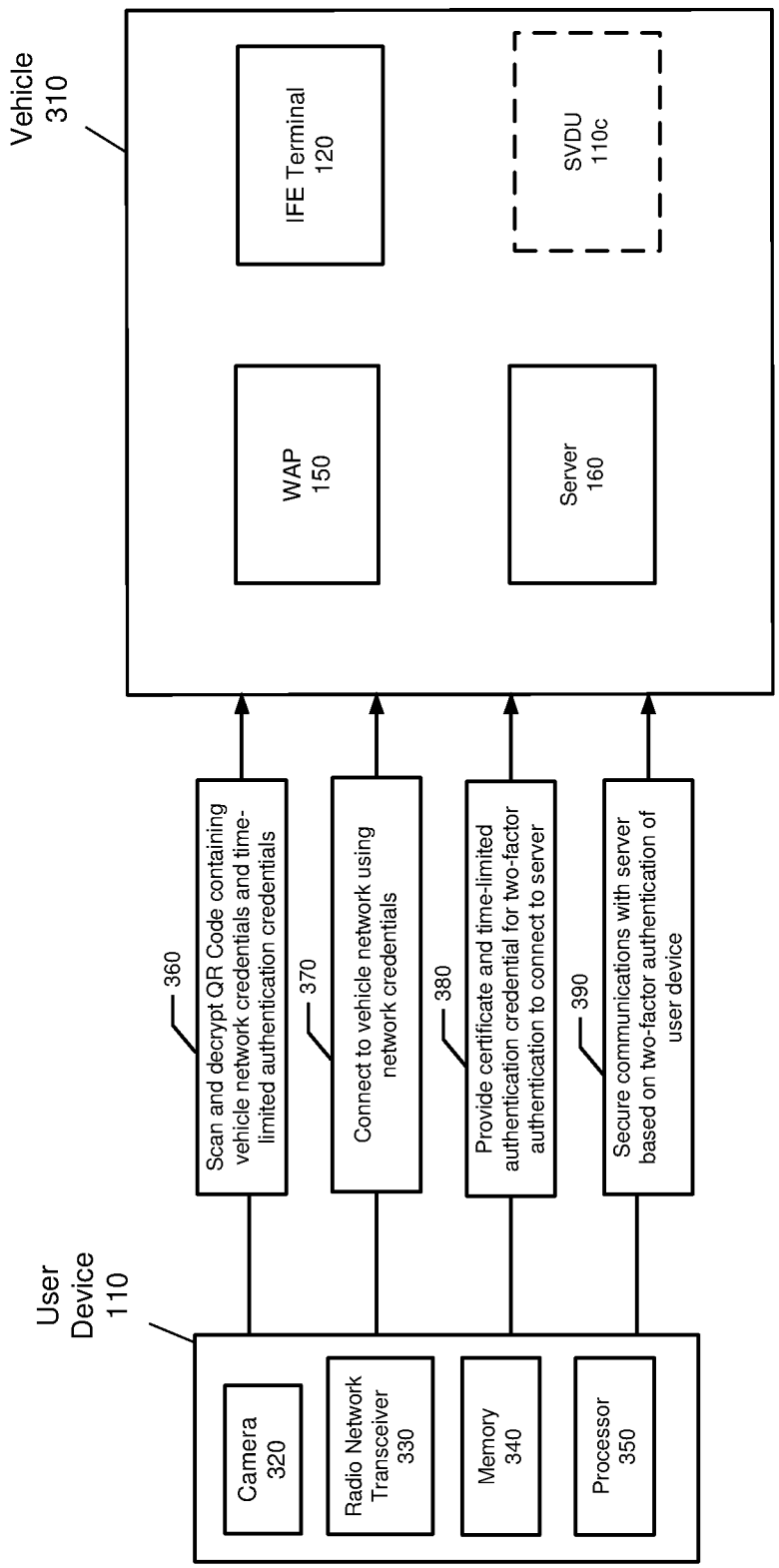
FIG. 3 is a combined data flow and block diagram that illustrates operations and data transfer between a user device and a vehicle in accordance with some embodiments of the present disclosure.

FIG. 3 is a combined data flow and block diagram that illustrates operations and data transfer between a user device and a vehicle in accordance with some embodiments of the present disclosure. In one embodiment, before a person operates a user device 110 to pair the user device 110 with a vehicle 310 computer system, a software application is installed in a memory 340 of the user device 110 ("installed application"). The installed application contains a unique certificate for authenticating the identity of the user device 110 and a private key for decrypting encrypted network credentials to connect to a network of the vehicle 310. The network may be a wireless network, a backbone network, such as a base-T Ethernet, or a BT scatternet wireless network. Server 160 located in vehicle 310 also has a certificate. The certificate provided to the user device 110 with the installed application and the certificate of the server 160 each have a digital signature issued by the same Root Certificate Authority. Each certificate contains a public key, claims and a digital signature of the public key and the claims.

Referring to FIGS. 2 and 3, after the application is installed on user device 110, the person operates a display of the IFE terminal 120 to access a pairing menu. Alternatively, the person may operate a display of an SVDU 110*c* to access a pairing menu. The pairing menu displays a QR code that contains encrypted data, including the network credentials for the vehicle 310 (e.g., Wi-Fi SSID and password) and a time-limited authentication credential for connecting to the server 160. Although various embodiments herein are primarily described in the context of a QR code, the network credentials and time-limited authentication credential could be encrypted in other optical machine-readable codes (e.g., bar codes, etc.) or in data communicated through a short range NFC or other type of short range RF signaling. The optically readable codes and short range communications are collectively referred to as encrypted codes.

The person operates the installed application and camera 320 of the user device 110 to scan the QR code. Using the private key installed with the installed application on the user device 110, the installed application decodes the QR code and decrypts the encoded data containing the network credentials and time-limited authentication credential.

Using the decrypted network credentials, the installed application on the user device 110 automatically connects to the network of vehicle 310 via the network interface of the user device 110 and initiates a request to connect to server 160. The request includes the unique certificate installed with the application on user device 110.

The user device 110 initiates communication with server 160. The user device 110 receives from server 160 the certificate of server 160. User device 110 uses a public key of the Root Certificate Authority to validate the certificate received from the server 160. The server 160 is authenticated by the user device 110 if the validation is successful.

Server 160 receives the connection request from user device 110. Responsive to the connection request, server 160 performs two-factor authentication of the user device 110 using (1) the unique certificate installed with the installed application on user device 110; and (2) the time-limited authentication credential from the decrypted QR code. More particularly, server 160 receives from the user device 110 the unique certificate that was installed with the installed application. Server 160 uses a public key of the Root Certificate Authority to validate the digital signature of the unique certificate received from the user device 110. The user device 110 is authenticated by the server 160 if the validation is successful. Server 160 also verifies the time-limited authentication credentials from the decrypted QR code, as described in more detail below. When the two-factor authentication is complete, server 160 is configured to establish a connection to user device 110 for secure communications.

Figure 4:
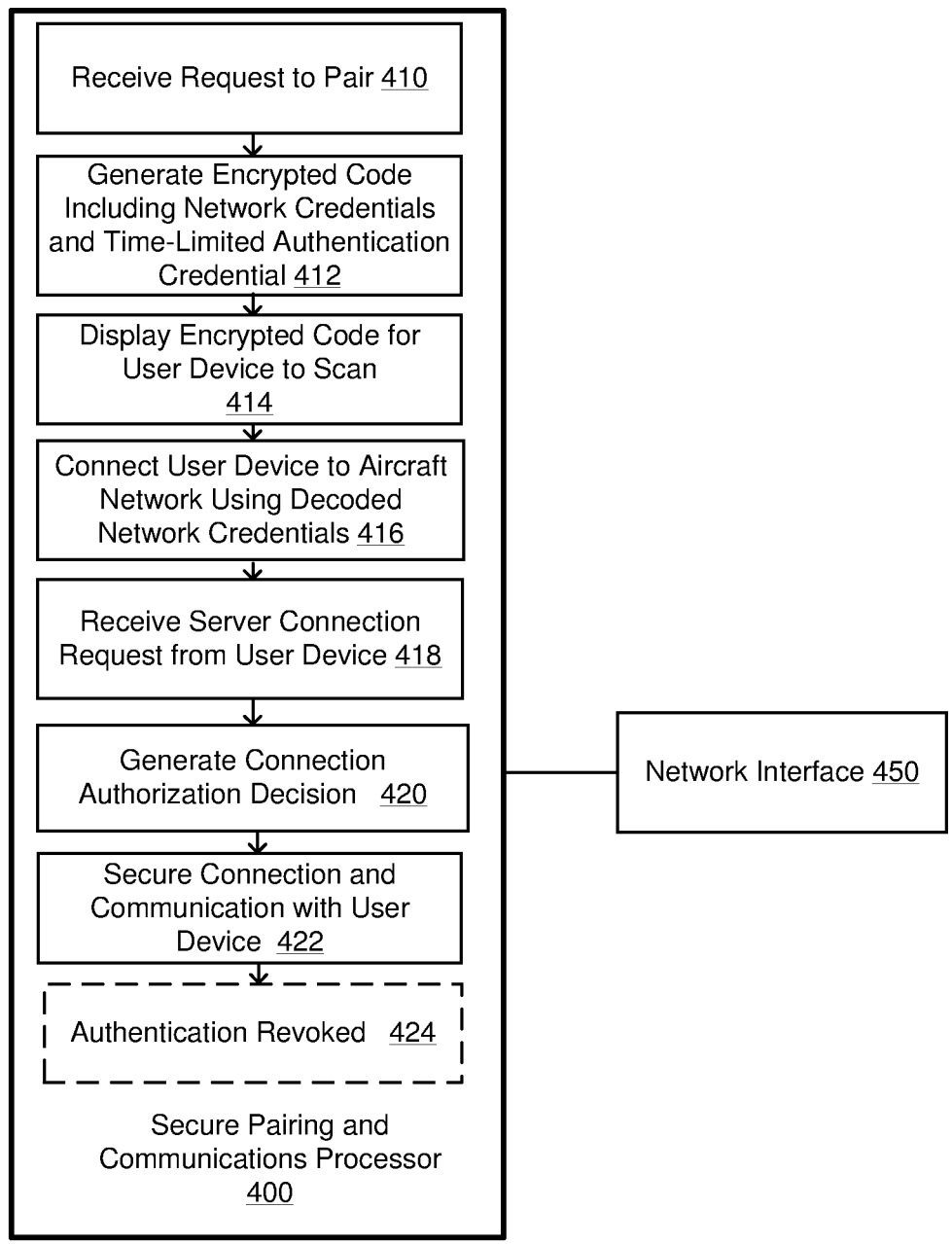
FIG. 4 is a block diagram of operational components of the server of FIG. 1 that processes and transfers data with user devices in accordance with some embodiments of the present disclosure.

FIG. 4 is a block diagram of operational components of the server 160 of FIG. 1 that processes and transfers data with user devices in accordance with some embodiments of the present disclosure.

In one embodiment, referring to FIGS. 1-4, after a passenger or crew member boards aircraft 140, the person operates the user device 110 to start the installed application. The person also operates the display of IFE terminal 120 or SVDU 110c to request to pair the user device 110 to the aircraft 140's network (block 410). Responsive to the request to pair, an aircraft processor operably connected to server 160 generates an encrypted code that includes encoded network credentials for connecting to the network of aircraft 140 via WAP 150 or an Ethernet interface and a time-limited authentication credential to uniquely identify user device 110 for securely connecting to server 160 (block 412).

The time-limited authentication credential is valid for connecting a single a user device 110 to the server 160 during a time period specified in the time-limited application credential. If server 160 does not connect to a user device 110 within the specified time period, the time-limited authentication credential expires. If the user device 110 connects to server 160 within the specified time period, that user device 110 is associated with the time-limited authentication credential. No other user device 110 can connect to server 160 using the same time-limited authentication credential.

Continuing with FIG. 4, the processor is configured to display the generated encrypted code on the display of IFE terminal 120 or SVDU 110c (block 414). The person operates the user device 110 to scan the displayed encrypted code. For example, the installed application includes a QR code reader operably connected to camera 320 of the user device 110 to scan and read the QR code. The installed application decodes the QR code and decrypts the encoded data using the private key installed with the application. The decrypted encoded data includes the network credentials and the time-limited authentication credential.

Continuing with FIG. 4, in further operations, using the decrypted network credentials, the installed application automatically connects user device 110 to the network of aircraft 140 (block 416) and initiates a connection request to connect user device 110 to server 160. The connection request includes the unique certificate installed with the application on user device 110 and the time-limited authentication credential decrypted from the optically readable code. The connection request, the unique certificate, and the time-limited authentication credential may be included in a single message or in separate messages and is referred to herein as a connection request.

The user device 110 initiates communication with server 160. The user device 110 receives from server 160 the certificate of server 160. User device 110 uses a public key of the Root Certificate Authority to validate the certificate received from the server 160. The server 160 is authenticated by the user device 110 if the validation is successful.

Server 160 receives the connection request from user device 110 (block 418). Responsive to the connection request, server 160 generates a connection authorization decision by performing two-factor authentication of the user device 110 using (1) the unique certificate installed with the installed application on user device 110; and (2) the time-limited authentication credential from the decrypted QR code (block 420). Server 160 receives from the user device 110 the unique certificate that was installed with the installed application. Server 160 uses a public key of the Root Certificate Authority to validate the digital signature of the unique certificate received from the user device 110. The user device 110 is authenticated by the server 160 if the validation is successful. Server 160 also authenticates the user device based on the time-limited authentication credential. Based on the time-limited authentication credential displayed in and decrypted from the QR code, server 160 waits for a connection from user device 110 for the specified time period in the time-limited authentication credential. If one user device 110 connects to server 160 within the specified time period, the user device 110 is authenticated and is associated with that time-limited authentication credential. No other user device 110 can connect to server 160 using the same time-limited application credential. If a user device 110 does not connect to server 160 within the specified time period, the time-limited authentication credential times out and no user device 110 can connect to server 160 using that time-limited authentication credential.

If the two-factor authentication of user device 110 is successful, server 160 is configured to securely connect user device 110 to server 160 and to securely communicate with user device 110 (block 422). If authentication of the user device fails either or both factors of the two-factor authentication, the user device 110 is not connected to server 160.

Two-factor authentication also permits revocation of either or both authentication factors for the user device 110 (block 424). Revocation of the unique certificate of a user device 110 prevents connection of that user device 110 to server 160, for example, across all aircraft of an airline operator. For example, a crew member may have a user device 110 with a previously authenticated unique certificate. If the crew member loses the user device 110, the previously authenticated unique certificate can be revoked to prevent access of that user device 110 to the servers 160 of all aircraft of the airline of the crew member. Revocation of the time-limited authentication credential of a user device 110 prevents connection of the user device 110 to server 160 unless the user device 110 is re-paired with server 160. For example, the time-limited authentication credential can be revoked responsive to a defined event, such as completion of a first leg of a multi-leg flight. If this occurs for the user device 110 of a crew member and the crew member boards an aircraft 140 for the next leg of a multi-leg flight, the crew member can operate the user device 110 to pair with server 160 and receive a new time-limited authentication credential for use on that leg of the multi-leg flight.

Figure 5:
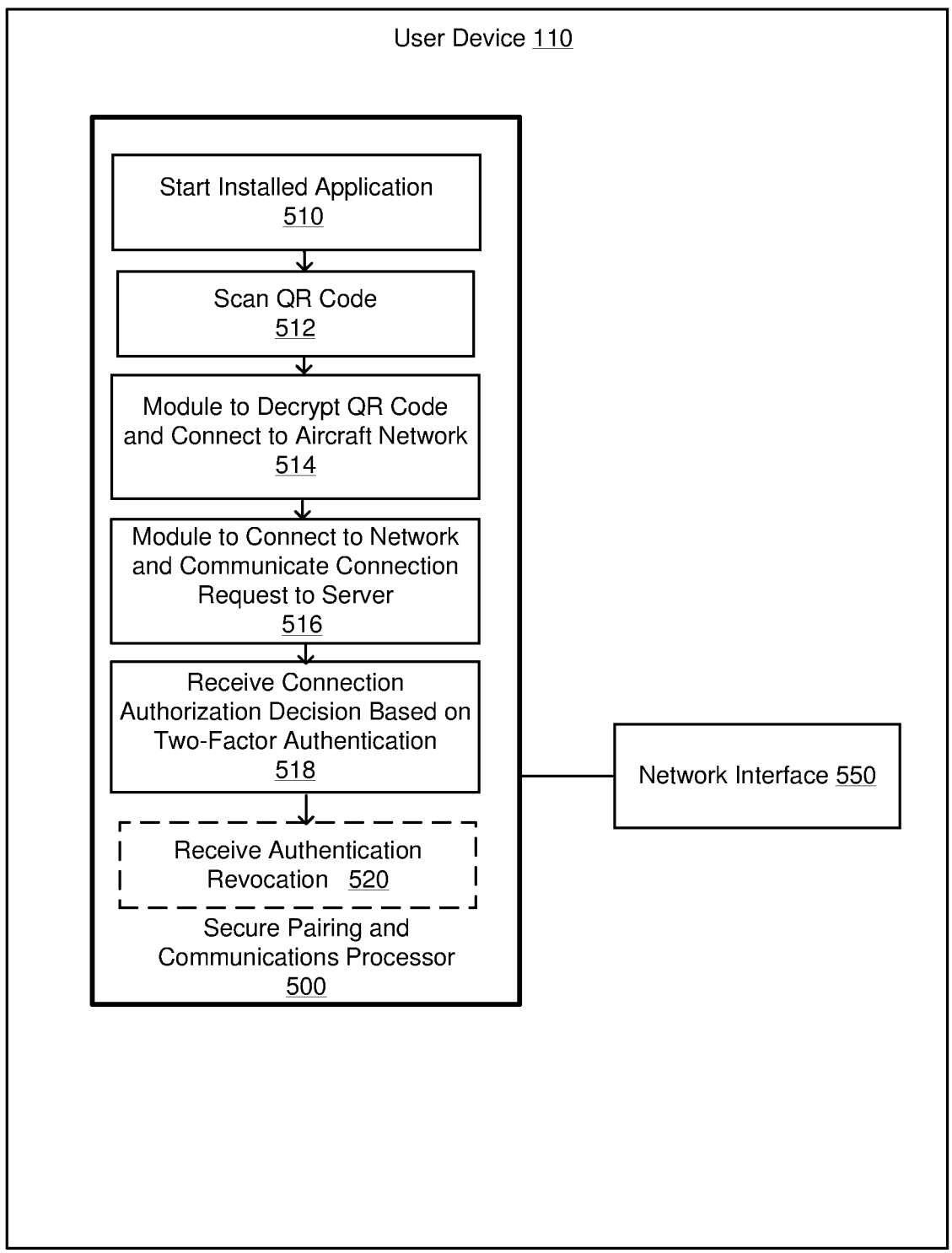
FIG. 5 is a block diagram of operational components of a user device of FIG. 1 that processes and transfers data with a server in accordance with some embodiments of the present disclosure.

FIG. 5 is a block diagram of operational components of a user device 110 of FIG. 1 that processes and transfers data with a server in accordance with some embodiments of the present disclosure.

Referring to FIGS. 1 and 5, a passenger, crew member or representative of the airline or other vehicle operator (e.g., information technology personnel) downloads and stores the installed application in a memory of user device 110. The download and installation may be performed in a secure location that is not modifiable and that is controlled by security controls of the operating system of the user device 110 in order to prevent unauthorized access to the downloaded and installed private key that will be used to decode the QR code and the certificate. After a passenger or crew member boards aircraft 140, the person operates the user device 110 having the installed application in memory to start the installed application (block 510). The passenger or crew member also operates the display of IFE terminal 120 or SVDU 110c to request to pair the user device 110 to the network of aircraft 140. Responsive to the request to pair, an aircraft processor operably connected to server 160 generates an encrypted code that includes encoded network credentials for connecting to the network of aircraft 140 via WAP 150 or an Ethernet interface and a time-limited authentication credential to uniquely identify user device 110 for securely connecting to server 160.

The processor is configured to display the generated encrypted code on the display of IFE terminal 120 or SVDU 110c. The passenger or crew member operates the user device 110 to scan and read the displayed encrypted code (block 512). For example, the installed application includes a QR code reader operably connected to a camera of the user device 110 to scan and read the QR code. The installed application decodes the QR code and decrypts the encoded data using the private key installed with the application (block 514). The decrypted encoded data includes the network credentials and time-limited authentication credentials.

Continuing with FIG. 5, in further operations, using the decrypted network credentials, the installed application automatically connects user device 110 to the network of aircraft 140 and initiates a connection request to connect user device 110 to server 160 (block 516). The connection request includes the unique certificate installed with the application on user device 110 and the time-limited authentication credential decrypted from the encrypted code. The connection request, the unique certificate, and the time-limited authentication credential may be included in a single message or in separate messages and is referred to herein as a connection request.

The user device 110 initiates communication with server 160. The user device 110 receives from server 160 the certificate of server 160. User device 110 uses a public key of the Root Certificate Authority to validate the certificate received from the server 160. The server 160 is authenticated by the user device 110 if the validation is successful.

Server 160 receives the connection request from user device 110. Responsive to the connection request, server 160 generates a connection authorization decision by performing two-factor authentication of the user device 110 using (1) the unique certificate installed with the installed application on user device 110; and (2) the time-limited authentication credential from the decrypted QR code. To authenticate the unique certificate of the user device 110, user device 110 presents the unique certificate installed and saved in memory of user device 110 to server 160 (block 516). Server 160 receives from the user device 110 the unique certificate that was installed with the installed application. Server 160 uses a public key of the Root Certificate Authority to validate the digital signature of the unique certificate received from the user device 110. The user device 110 is authenticated by the server 160 if the validation is successful. Server 160 also authenticates the user device based on the time-limited authentication credential. Based on the time-limited authentication credential displayed in and decrypted from the QR code, server 160 waits for a connection from user device 110 for the specified time period in the time-limited authentication credential (block 516). If the user device 110 connects to server 160 within the specified time period, the user device 110 is authenticated and is associated with that time-limited authentication credential. No other user device 110 can connect to server 160 using the same time-limited application credential. If a user device 110 does not connect to server 160 within the specified time period, the time-limited authentication credential times out and no user device 110 can connect to server 160 using that time-limited authentication credential.

If the two-factor authentication of user device 110 is successful, server 160 is configured to securely connect user device 110 to server 160 and to securely communicate with user device 110 (block 518). If authentication of the user device fails either or both factors of the two-factor authentication, the user device 110 is not connected to server 160 (block 518).

Two-factor authentication permits revocation of either or both authentication factors for the user device 110 (block 520), as disclosed in more detail with reference to FIG. 4.

Figure 6:
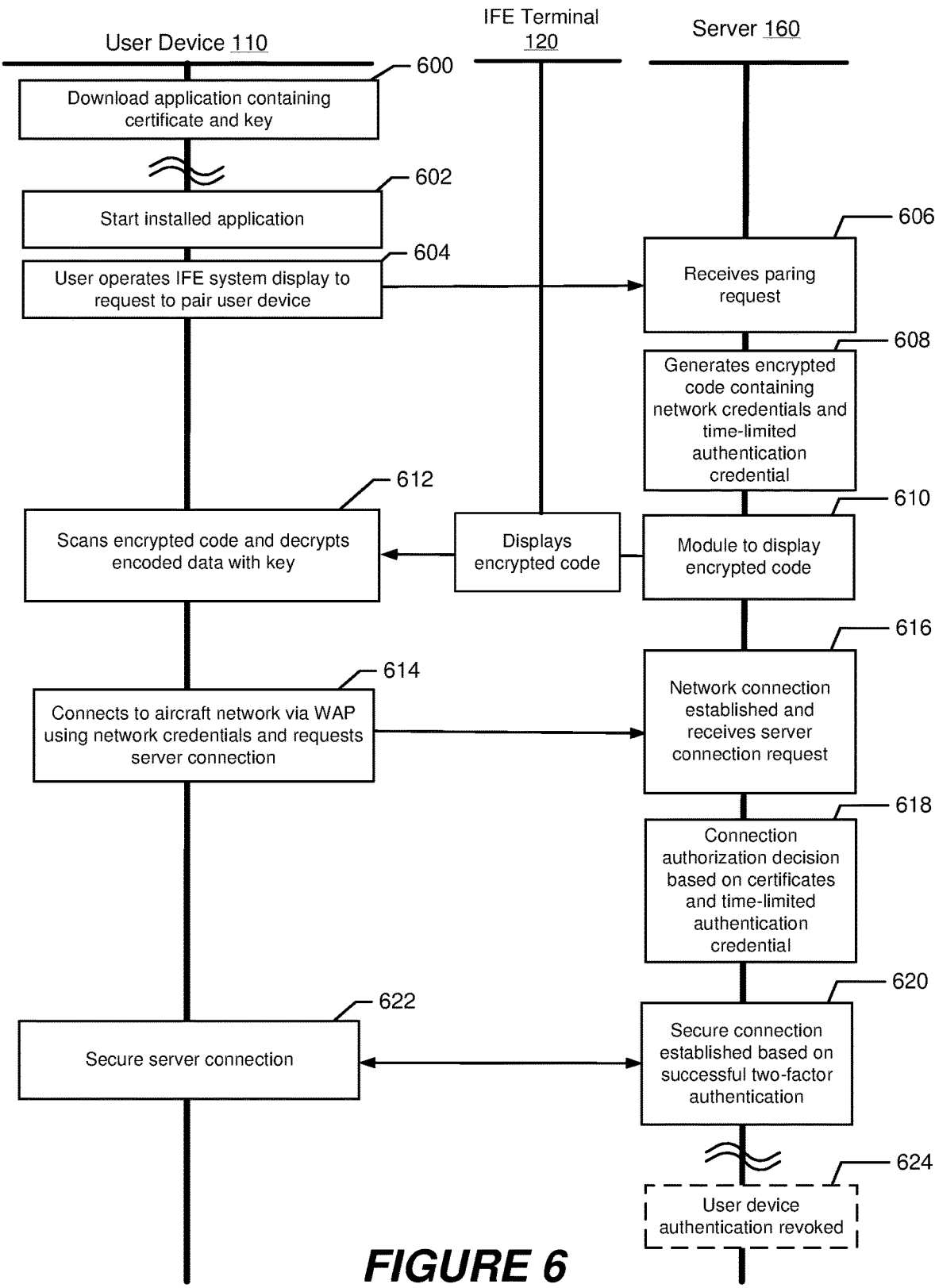
FIG. 6 is a combined flowchart and data flow diagram that illustrates operations and data transfers between a user device and a server in accordance with some embodiments of the present disclosure.

Various further operational embodiments are now described in the context of FIG. 6 which is a combined flowchart and data flow diagram that illustrates operations and data transfers between a user device 110 and server 160. In the example embodiment, a passenger, crew member or representative of the airline or other vehicle operator (e.g., information technology personnel) downloads and stores the installed application in a memory of user device 110 (block 600). After a passenger or crew member boards aircraft 140, the person operates the user device 110 having the installed application in memory to start the installed application (block 602). The passenger or crew member also operates the display of IFE terminal 120 or SVDU 110c to request to pair the user device 110 to the network of the aircraft 140 (block 604). Server 160 receives the request (block 606). Responsive to the request to pair, an aircraft processor operably connected to server 160 generates an encrypted code that includes an encoded network credentials for connecting to the aircraft 140's network via WAP 150 or Ethernet interface and a time-limited authentication credential to uniquely identify user device 110 for securely connecting to server 160 (block 608).

The processor is configured to display the generated encrypted code on the display of IFE terminal 120 or SVDU 110c (block 610). The passenger or crew member operates the user device 110 to scan and read the displayed encrypted code (block 612). For example, the installed application includes a QR code reader operably connected to a camera of the user device 110 to scan the QR code. The installed application decodes the QR code and decrypts the encoded data using the private key installed with the application. The decrypted encoded data includes the network credentials and time-limited authentication credentials.

Continuing with FIG. 6, in further operations, using the decrypted network credentials, the installed application automatically connects user device 110 to the network of aircraft 140 and initiates a connection request to connect (block 614) user device 110 to server 160. The connection request includes the unique certificate installed with the application on user device 110 and the time-limited authentication credential decrypted from the encrypted code. The connection request, the unique certificate, and the time-limited authentication credential may be included on a single message or in separate messages and is referred to herein as a connection request.

The user device 110 initiates communication with server 160. The user device 110 receives from server 160 the certificate of server 160. User device 110 uses a public key of the Root Certificate Authority to validate the certificate received from the server 160. The server 160 is authenticated by the user device 110 if the validation is successful.

Server 160 also receives the connection request from user device 110 (block 616). Responsive to the connection request, server 160 generates a connection authorization decision (block 618) by performing two-factor authentication of the user device 110 using (1) the unique certificate installed with the installed application on user device 110; and (2) the time-limited authentication credential from the decrypted QR code (block 620). To authenticate the unique certificate of the user device 110, in the connection request, user device 110 presents the unique certificate installed and saved in memory of user device 110 to server 160. Server 160 receives from the user device 110 the unique certificate that was installed with the installed application. Server 160 uses a public key of the Root Certificate Authority to validate the digital signature of the unique certificate received from the user device 110. The user device 110 is authenticated by the server 160 if the validation is successful. Server 160 also authenticates the user device based on the time-limited authentication credential. Based on the time-limited authentication credential displayed in and decrypted from the QR code, server 160 waits for a connection from user device 110 for the specified time period in the time-limited authentication credential. If the user device 110 connects to server 160 within the specified time period, the user device 110 is authenticated and is associated with that time-limited authentication credential (block 618). No other user device 110 can connect to server 160 using the same time-limited application credential. If a user device 110 does not connect to server 160 within the specified time period, the time-limited authentication credential times out and no user device 110 can connect to server 160 using that time-limited authentication credential.

If the two-factor authentication of user device 110 is successful, server 160 is configured to securely connect user device 110 to server 160 (block 620) and to securely communicate with user device 110 (block 622). If authentication of the user device fails either or both factors of the two-factor authentication, the user device 110 is not connected to server 160 (block 620).

Two-factor authentication permits revocation of either or both authentication factors for the user device 110 (block 624), as disclosed in more detail with reference to FIG. 4.

Figure 7:
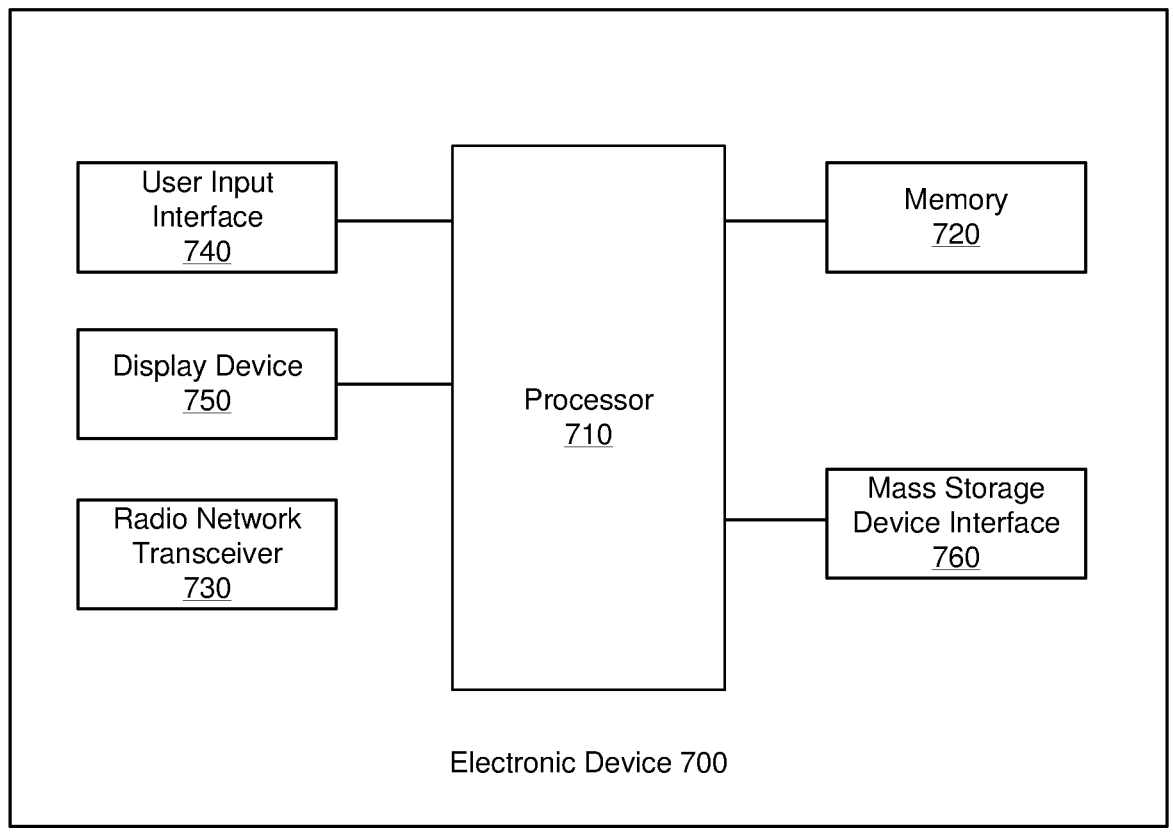
FIG. 7 is a block diagram of elements of an electronic device configured to operate in accordance with some embodiments of the present disclosure.

FIG. 7 is a block diagram of an electronic device 700 configured to operate according to some embodiments of the present disclosure. Referring to FIG. 7, the electronic device 700 includes a processor 710, a memory 720, and a radio network transceiver 730 which can include, but is not limited to, a LTE or other cellular transceiver, WLAN transceiver (IEEE 802.11), WiMax transceiver, BT transceiver, or other radio communication transceiver or wired network interface (e.g., Ethernet and/or USB) configured to communicate with the user device 110.

The processor 710 may include one or more data processing circuits, such as a general purpose and/or special purpose processor (e.g., microprocessor and/or digital signal processor) that may be collocated or distributed across one or more networks. The processor 710 is configured to execute computer program code in the memory 710, described below as a non-transitory computer readable medium, to perform at least some of the operations described herein as being performed by an access control computer. The computer program code when executed by the processor 710 causes the processor 710 to perform operations in accordance with one or more embodiments disclosed herein for the electronic device 700. The electronic device 700 may further include a user input interface 740 (e.g., touch screen, keyboard, keypad, etc.), a display device 750, and a mass storage device interface 760.

Figure 8:
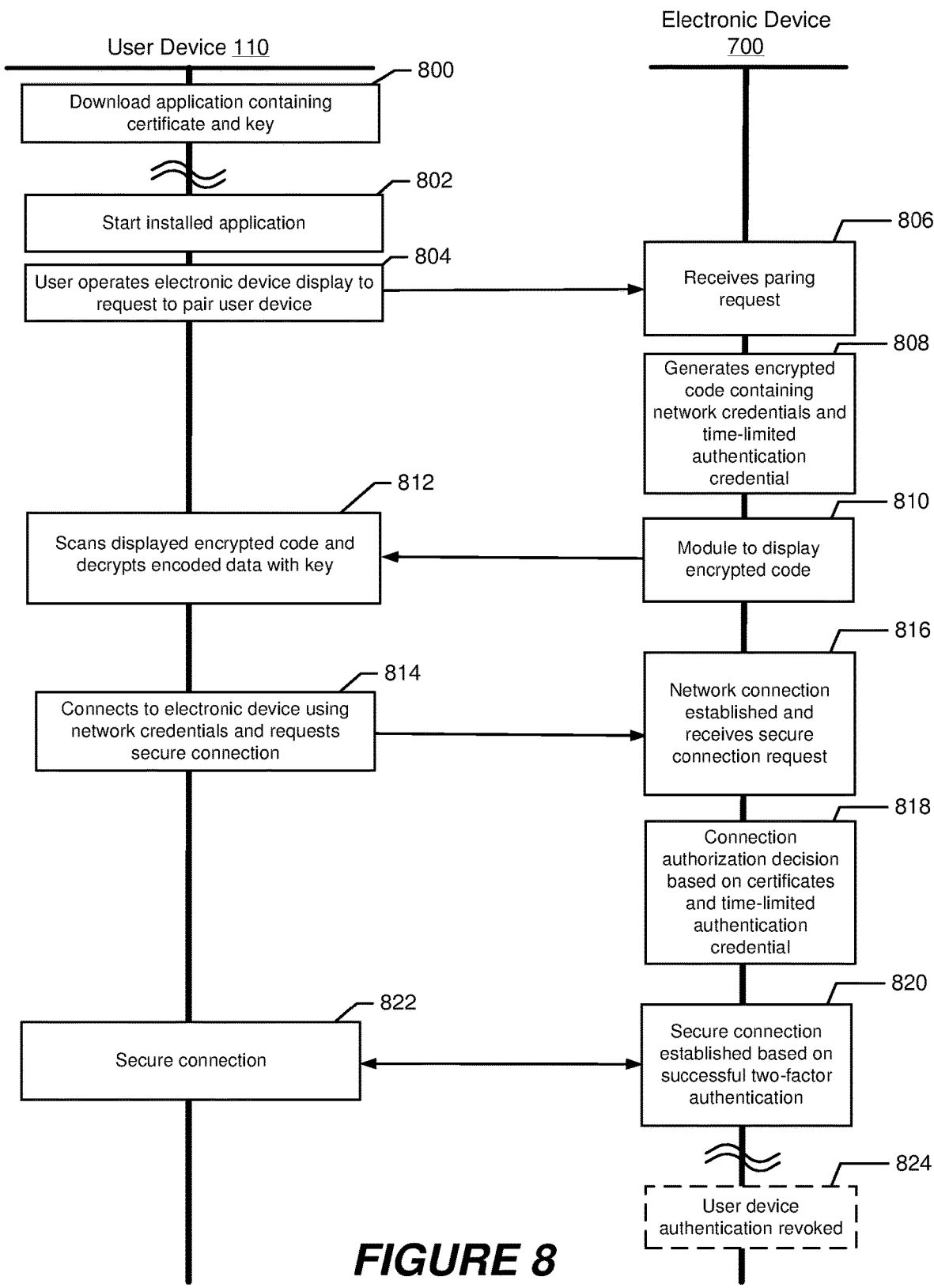
FIG. 8 is a combined flowchart and data flow diagram that illustrates operations and data transfers between a user device and an electronic device in accordance with some embodiments of the present disclosure.

Various further operational embodiments are now described in the context of FIG. 8 which is a combined flowchart and data flow diagram that illustrates operations and data transfers between a user device 110 and an electronic device 700, such as a medical device. In the example embodiment, a person downloads and stores the installed application in a memory of user device 110 (block 800). The download and installation may be performed in a secure location that is not modifiable and that is controlled by security controls of the operating system of the user device 110 in order to prevent unauthorized access to the downloaded and installed private key that will be used to decode the QR code and the certificate. After the application is installed, the person operates the user device 110 having the installed application in memory to start the installed application (block 802). The person also operates the display of the electronic device to request to pair the user device 110 to the electronic device (block 804). The electronic device 700 receives the request (block 806). Responsive to the request to pair, a processor 710 of the electronic device 700 generates an encrypted code that includes an encoded network credentials for connecting to the electronic device 700 via radio network transceiver 730 and a time-limited authentication credential to uniquely identify user device 110 for securely connecting to electronic device 700 (block 808).

The processor 710 is configured to display the generated encrypted code on the display of electronic device 700 (block 810). The person operates the user device 110 to scan and read the displayed encrypted code (block 812). For example, the installed application includes a QR code reader operably connected to a camera of the user device 110 to scan the QR code. The installed application decodes the QR code and decrypts the encoded data using the private key installed with the application. The decrypted encoded data includes the network credentials and time-limited authentication credentials.

Continuing with FIG. 8, in further operations, using the decrypted network credentials, the installed application automatically pairs user device 110 to the electronic device 700 and initiates a connection request for secure communications (block 814) between user device 110 to electronic device 700. The connection request includes the unique certificate installed with the application on user device 110 and the time-limited authentication credential decrypted from the encrypted code. The connection request, the unique certificate, and the time-limited authentication credential may be included on a single message or in separate messages and is referred to herein as a connection request.

The user device 110 initiates communication with electronic device 700. The user device 110 receives the certificate of electronic device 700. User device 110 uses a public key of the Root Certificate Authority to validate the certificate received from the electronic device 700. The electronic device 700 is authenticated by the user device 110 if the validation is successful.

Electronic device 700 receives the connection request from user device 110 (block 816). Responsive to the connection request, electronic device 700 generates a connection authorization decision (block 818) by performing two-factor authentication of the user device 110 using (1) the unique certificate installed with the installed application on user device 110; and (2) the time-limited authentication credential from the decrypted QR code. To authenticate the unique certificate of the user device 110, in the connection request, user device 110 presents the unique certificate installed and saved in memory of user device 110 to electronic device 700 (block 820). Electronic device 700 has the certificate of the Root Certificate Authority. Electronic device 700 receives from the user device 110 the unique certificate that was installed with the installed application. Electronic device 700 uses a public key of the Root Certificate Authority to validate the digital signature of the unique certificate received from the user device 110. The user device 110 is authenticated by the electronic device 700 if the validation is successful. Electronic device 700 also authenticates the user device based on the time-limited authentication credential. Based on the time-limited authentication credential displayed in and decrypted from the QR code, electronic device 700 waits for a connection from user device 110 for the specified time period in the time-limited authentication credential (block 820). If the user device 110 connects to electronic device 700 within the specified time period, the user device 110 is authenticated and is associated with that time-limited authentication credential (block 818). No other user device 110 can connect to electronic device 700 using the same time-limited application credential. If a user device 110 does not connect to electronic device 700 within the specified time period, the time-limited authentication credential times out and no user device 110 can connect to electronic device 700 using that time-limited authentication credential.

If the two-factor authentication of user device 110 is successful, electronic device 700 is configured to securely connect user device 110 to electronic device 700 (block 820) and to securely communicate with user device 110 (block 822). If authentication of the user device fails either or both factors of the two-factor authentication, the user device 110 is not connected to electronic device 700 (block 820).

Two-factor authentication permits revocation of either or both authentication factors for the user device 110 (block 824), as disclosed in more detail with reference to FIG. 4.

Figure 9:
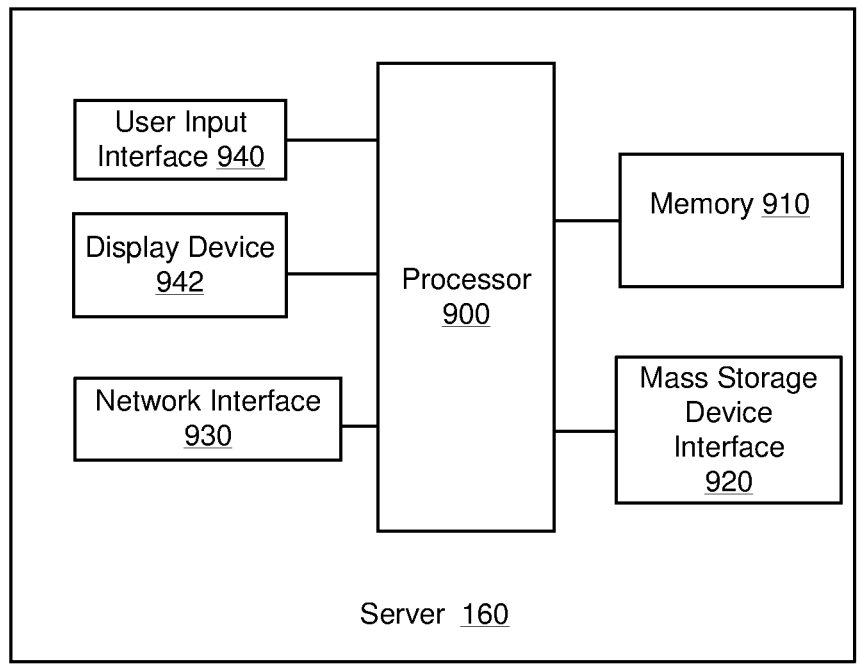
FIG. 9 is a block diagram of a sever configured to operate according to some embodiments of the present disclosure.

FIG. 9 is a block diagram of a server 160 configured to operate according to some embodiments of the present disclosure. The server may be configured to operate as the server 160 and/or the vehicle based server disclosed herein. Referring to FIG. 9, the server 160 includes a processor 900, a memory 910, and a network interface 930 which may include a radio access network transceiver and/or a wired network interface (e.g., Ethernet interface). The network interface 930 is configured to communicate with user devices 110.

The processor 900 may include one or more data processing circuits, such as a general purpose and/or special purpose processor (e.g., microprocessor and/or digital signal processor) that may be collocated or distributed across one or more networks. The processor 900 is configured to execute computer program code in the memory 910, described below as a non-transitory computer readable medium, to perform at least some of the operations described herein as being performed by an access control computer. The computer program code when executed by the processor 900 causes the processor 900 to perform operations in accordance with one or more embodiments disclosed herein for the aircraft based content server 160. The server may further include a mass storage device interface 920 (e.g., connector), user input interface 940 (e.g., touch screen, keyboard, keypad, etc.), and a display device 942.

Figure 10:
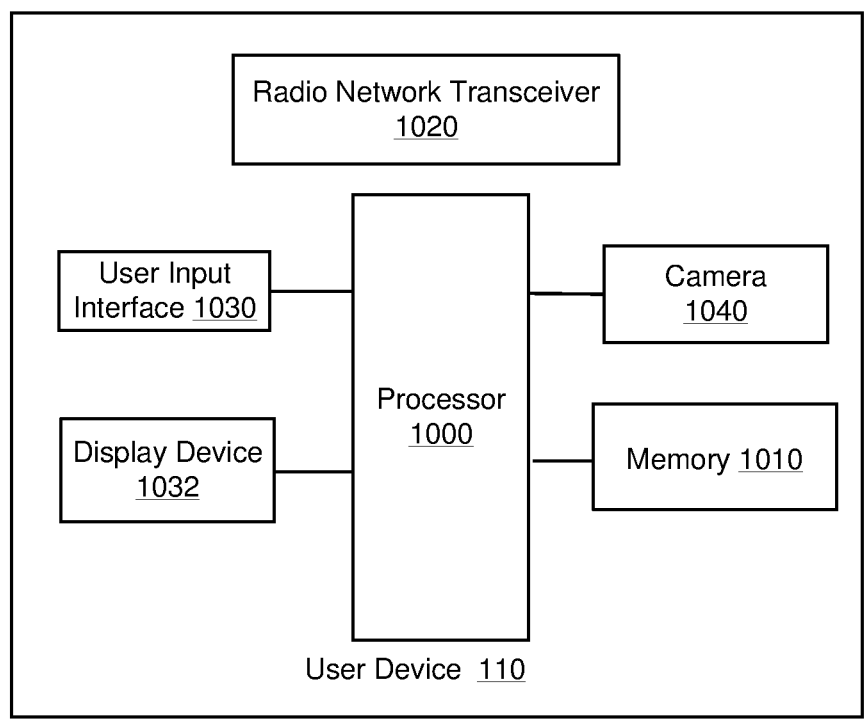
FIG. 10 is a block diagram of elements of a user device configured to operate in accordance with some embodiments of the present disclosure.

FIG. 10 is a block diagram of a user device 110 configured to operate according to some embodiments of the present disclosure. Referring to FIG. 10, the user device 110 includes a processor 1000, a memory 1010, and a radio network transceiver 1020 which can include, but is not limited to, a LTE or other cellular transceiver, WLAN transceiver (IEEE 802.11), WiMax transceiver, BT transceiver, or other radio communication transceiver or wired network interface (e.g., Ethernet and/or USB) configured to communicate with the server 160.

The processor 1000 may include one or more data processing circuits, such as a general purpose and/or special purpose processor (e.g., microprocessor and/or digital signal processor) that may be collocated or distributed across one or more networks. The processor 1000 is configured to execute computer program code in the memory 1010 (e.g., including the installed application), described below as a non-transitory computer readable medium, to perform at least some of the operations described herein as being performed by an access control computer. The computer program code when executed by the processor 1000 causes the processor 1000 to perform operations in accordance with one or more embodiments disclosed herein for the user device 110. The user device 110 may further include a user input interface 1030 (e.g., touch screen, keyboard, keypad, etc.), a display device 1032, and a camera 1040.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more open standard file formats or programming languages, including JavaScript Object Notation (JSON) or an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an ISP) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An inflight entertainment system for use in an aircraft, the inflight entertainment system comprising:
    a display device;
    a network interface;
    a server of the inflight entertainment system having a first certificate that is digitally signed;
    at least one processor connected to the network interface, the display device, and the server of the inflight entertainment system; and
    at least one memory connected to the at least one processor and storing program code that is executed by the at least one processor to perform operations comprising:
        receiving a request to pair a user device to the network interface, wherein the request to pair is received from the display device;
        responsive to the request to pair, generating an encrypted code, wherein the encrypted code comprises (i) network credentials for connecting to the network interface of the inflight entertainment system and (ii) a time-limited authentication credential that is unique to the user device for a time period specified in the time-limited authentication credential, for securely connecting to the server;
        communicating the encrypted code to the user device to decrypt;
        connecting to the user device through the network interface based on the user device presenting, without display, the network credentials from the decrypted code;
        receiving a request to connect to the server of the inflight entertainment system from the user device having a second certificate from the user device that is digitally signed and is unique to the user device;
        responsive to the request to connect, generating a connection authentication decision for the user device based on two-factor authentication, wherein the two-factor authentication comprises (i) validating the second certificate that is unique to the user device, and (ii) validating the time-limited authentication credential that is unique to the user device within the time period specified in the time-limited authentication credential; and
        connecting the user device to the server of the inflight entertainment system for secure communications between the user device and the server when the connection authorization decision authorizes the connection based on successful two-factor authentication.

2. The inflight entertainment system of claim 1, wherein the encrypted code comprising the (i) network credentials and (ii) the time-limited authentication credential is at least one of: a QR code; a bar code; an optical machine-readable code; data communicated through a near field communication; data communicated through RF signaling.

3. The inflight entertainment system of claim 1, wherein the operation for two-factor authentication based on the second certificate comprises:
    receiving the second certificate from the user device;
    validating the second certificate using a public key of a root certificate authority that issued the digital signature of the second certificate; and
    authenticating the user device based upon successful validation of the second certificate.

4. The inflight entertainment system of claim 1, wherein the operation for two-factor authentication based on the time-limited authentication credential, comprises:
    determining whether the user device connects to the server within a time period specified in the time-limited authentication credential from when the request to connect to the server is communicated; and
    authenticating the time-limited authentication credential when the user device connects to the server within the time period specified in the time-limited authentication credential.

5. The inflight entertainment system of claim 1, wherein the time-limited authentication credential is valid for the connection authentication decision for only a single pairing of the user device to the server.

6. The inflight entertainment system of claim 1, wherein the second certificate is valid for only a single user device.

7. The inflight entertainment system of claim 1, wherein the operations further comprise:
    revoking the successful two-factor authentication of the user device by revoking at least one of: the validated second certificate and the validated time-limited authentication credential; and
    responsive to performing revocation, terminating the connection between the user device and the server.

8. An entertainment system comprising:
    a display device;
    a network interface;
    a server having a first certificate that is digitally signed;
    at least one processor connected to the network interface, the display device, and the server; and
    at least one memory connected to the at least one processor and storing program code that is executed by the at least one processor to perform operations comprising:
        receiving a request to pair a user device to the network interface, wherein the request to pair is received from the display device;
        responsive to the request to pair, generating an encrypted code, wherein the encrypted code comprises (i) network credentials for connecting to the network interface of the inflight entertainment system, and (ii) a time-limited authentication credential that is unique to the user device for a time period specified in the time-limited authentication credential, for securely connecting to the server;
        communicating the encrypted code to the user device to decrypt;

connecting to the user device through the network interface based on the user device presenting, without display, the network credentials from the decrypted code;

receiving a request to connect to the server from the user device having a second certificate from the user device that is digitally signed and is unique to the user device;

responsive to the request to connect, generating a connection authentication decision for the user device based on two-factor authentication, wherein the two-factor authentication comprises (i) validating the second certificate that is unique to the user device, and (ii) validating the time-limited authentication credential that is unique to the user device within the time period specified in the time-limited authentication credential; and connecting the user device to the server for secure communications between the user device and the server when the connection authorization decision authorizes the connection based on successful two-factor authentication.

9. The entertainment system of claim 8, wherein the encrypted code comprising the (i) network credentials and (ii) the time-limited authentication credential is at least one of: a QR code; a bar code; an optical machine-readable code; data communicated through a near field communication signal; data communicated through RF signaling.

10. The entertainment system of claim 8, wherein the operation for two-factor authentication based on the second certificate comprises:

receiving the second certificate from the user device;

validating the second certificate using a public key of a root certificate authority that issued the digital signature of the second certificate; and authenticating the user device based upon successful validation of the second certificate.

11. The entertainment system of claim 8, wherein the operation for two-factor authentication based on the time-limited authentication credential, comprises:

determining whether the user device connects to the server within a time period specified in the time-limited authentication credential from when the request to connect to the server is communicated; and authenticating the time-limited authentication credential when the a user device connects to the server within the time period specified in the time-limited authentication credential.

12. The entertainment system of claim 8, wherein the time-limited authentication credential is valid for the connection authentication decision only for a single pairing of the user device to the server.

13. The entertainment system of claim 8, wherein the second certificate is valid for only a single user device.

14. The entertainment system of claim 8, wherein the operations further comprise:

revoking the successful two-factor authentication of the user device by revoking at least one of: the validated second certificate and the validated time-limited authentication credential; and responsive to performing revocation, terminating the connection between the user device and the server.

15. An electronic device having a first certificate that is digitally signed comprising:

a display device;
a network interface;
at least one processor connected to the network interface and the display device;
and
at least one memory connected to the at least one processor and storing program code that is executed by the at least one processor to perform operations comprising:

receiving a request to pair a user device to the network interface, wherein the request to pair is received from the display device;

responsive to the request to pair, generating an encrypted code, wherein the encrypted code comprises (i) network credentials for connecting to the network interface of the inflight entertainment system, and (ii) a time-limited authentication credential that is unique to the user device for a time period specified in the time-limited authentication credential, for securely connecting to the at least one processor;

communicating the encrypted to the user device to decrypt;

pairing the user device having a second certificate from the user device that is digitally signed and is unique to the user device to the network interface based on the user device presenting, without display, the network credentials from the decrypted code;

responsive to the pairing, generating a connection authentication decision for secure communications for the user device based on two-factor authentication, wherein the two-factor authentication comprises (i) validating the second certificate that is unique to the user device, and (ii) validating the time-limited authentication credential that is unique to the user device within the time period specified in the time-limited authentication credential; and connecting the user device to the at least one processor for secure communications between the user device and the at least one processor when the connection authorization decision authorizes the connection based on successful two-factor authentication.

16. The electronic device of claim 15, wherein the encrypted code comprising the (i) network credentials and (ii) the time-limited authentication credential is at least one of: a QR code; a bar code; an optical machine-readable code; data communicated through a near field communication signal; data communicated through RF signaling.

17. The electronic device of claim 15, wherein the operation for two-factor authentication based on the second certificate comprises:

receiving the second certificate from the user device;

validating the second certificate using a public key of a root certificate authority that issued the digital signature of the second certificate; and authenticating the user device based upon successful validation of the second certificate.

18. The electronic device of claim 15, wherein the operation for two-factor authentication based on the time-limited authentication credential, comprises:

determining whether the a user device connects to the electronic device within a time period specified in the time-limited authentication credential from when the request to connect to the server is communicated; and authenticating the time-limited authentication credential when the user device connects to the electronic device within the time period specified in the time-limited authentication credential.

19. The electronic device of claim 15, wherein the time-limited authentication credential is valid for the connection authentication decision for only a single pairing of the user device to the electronic device.

20. The electronic device of claim 15, wherein the second certificate is valid for only a single user device.

21. The electronic device of claim 15, wherein the operations further comprise:
   revoking the successful two-factor authentication of the user device by revoking at least one of: the validated second certificate and the validated time-limited authentication credential; and
   responsive to performing revocation, terminating the connection between the user device and the server.

* * * * *